United States Patent [19]

Reissmann et al.

[11] 4,389,426

[45] Jun. 21, 1983

[54] 25 TO 65 WT. % FAT CONTENT WATER-IN-OIL EMULSION SPREAD WHOSE AQUEOUS PHASE COMPRISES A GELLING SYSTEM

[75] Inventors: Hermann A. W. Reissmann, Ellerbek; Bernd T. Milo, Hamburg, both of Fed. Rep. of Germany

[73] Assignee: Lever Brothers Company, New York, N.Y.

[21] Appl. No.: 321,028

[22] Filed: Nov. 13, 1981

[30] Foreign Application Priority Data

Nov. 22, 1980 [GB] United Kingdom ................ 8037545

[51] Int. Cl.$^3$ ......................... A23D 5/00; A23D 3/00
[52] U.S. Cl. .................................... 426/602; 426/603; 426/804
[58] Field of Search ............................... 426/602, 603

[56] References Cited

U.S. PATENT DOCUMENTS 2,203,643  6/1940  Musher .............................. 426/602
3,986,890  10/1976  Richter et al. .................. 426/578 X
4,146,652  3/1979  Kahn et al. ..................... 426/602 X
4,273,795  6/1981  Bosco et al. ....................... 426/602

OTHER PUBLICATIONS

Corn Syrups and Sugars, Corn Ind. Res. Foundation, Inc., New York, N.Y., 1958 pp. 15, 33.

*Primary Examiner*—Robert A. Yoncoskie
*Attorney, Agent, or Firm*—Milton L. Honig; James J. Farrell

[57] ABSTRACT

Water-in-oil emulsion spread having a fat content ranging from 25 to 65 wt %, which comprises a dispersed aqueous phase containing a gelling system comprising at least on hydrocolloid (i) capable of forming a linear gel structure under conditions allowing gelling of said hydrocolloid (i) and at least one hydrocolloid (ii) capable of forming a spherical gel structure under conditions allowing gelling of said hydrocolloid (ii).

Said spread being stable on storage and sufficiently unstable under temperature and shear conditions prevailing in the mouth to allow preception of watersoluble components of the aqueous phase.

6 Claims, No Drawings

25 TO 65 WT. % FAT CONTENT WATER-IN-OIL EMULSION SPREAD WHOSE AQUEOUS PHASE COMPRISES A GELLING SYSTEM

The invention relates to a low-fat spread, particularly a protein-containing low-fat spread.

Low-fat spreads are generally water-in-oil emulsions comprising a continuous fat phase, a dispersed thickened aqueous phase and a stabilizing emulsifier.

By low-fat spreads is meant throughout the specification emulsions which, compared with butter or conventional margarine, have a considerably reduced fat content, ranging from 25 to 65%, preferably from 30 to 50% by weight of the emulsion.

Owing to this relatively high water content, the organoleptic properties of such emulsions are poor, and for that reason proteins are often incorporated in the aqueous phase. Proteins, especially milk proteins, have however in some cases a strongly destabilizing effect on the emulsions. Gelling agents incorporated in the aqueous phase of the emulsion counteract this effect. The mechanism of this counteraction is assumed to involve encapsulating or complexing of the protein with the gelling agent, binding of the water of the aqueous phase and increasing its viscosity.

Guar gum has been proposed as the gelling agent. The gel formed with guar gum and water is however far too stable under chewing conditions and gives a waxy impression on the palate.

Gelatin, when used in low-fat spreads as described in GB 1 564 800 gives satisfactory results. However, the relatively high cost price of gelatin renders the use of this ingredient less attractive. There is consequently a need for a gelling system which, with regard to organoleptic properties and particularly the melting behaviour under palate conditions, matches with gelatin without being prohibitive in view of its price.

The present invention is based on the discovery that the use in low-fat spreads of a colloid capable of forming in the aqueous phase a linear gel structure, combined with the use of a colloid capable of forming in said aqueous phase a spherical gel structure, results in a sufficient stabilization of said spreads under storage conditions, whereas under palate conditions the gel structure destabilizes and results in a melting behaviour which is perceived as pleasant by the consumer.

Suitable hydrocolloids forming a linear gel structure comprise starch hydrolysates, pectins, lambda carrageenan and alginates. Particularly suitable are dextrins having a DE (Dextrose Equivalent) value of at least 20 and preferably of between 40 and 65, and pectins which have been highly esterified (methyl ester). Pectins with a degree of esterification of at least 48%, and preferably up to 74% or higher are preferred. These pectins are to some extent sensitive to the presence of calcium ions.

Suitable hydrocolloids forming a spherical gel structure comprise guar gum, locust bean gum and iota carrageenan.

A gelling system which resulted in a very satisfactory melting behaviour of the low-fat spreads according to the invention comprised a mixture of guar gum and highly esterified pectins, provided the ratio of guar gum:pectin was greater than 4 and preferably 6 or even greater than 6.

Guar gum is preferably used in a proportion ranging from 0.1 to 1.0% by weight, ideally 0.2 to 0.5% by weight, whereas pectins and dextrins are used in an amount ranging from 0.01 to 0.3%, preferably in an amount ranging from 0.03 to 0.75% by weight.

The aqueous phase of the low-fat spreads according to the invention may contain proteins, e.g. milk proteins, vegetable proteins or microbial proteins. The protein content may vary from 0.01 to 8%, preferably from 1 to 5% by weight.

For bacteriological reasons the pH of the aqueous phase should range from 3.0 to 6.8 and preferably from 4.6 to 5.8.

The aqueous phase may further contain salts, preservatives and emulsifiers.

The fat phase of the low-fat spreads according to the invention may comprise colouring substances, vitamins, antioxidants and emulsifiers. The composition of the fat blends to be used may greatly vary, subject to the kind of product one desires in a particular country. Preferably a plastic fat blend is used which has the following solids content at the given temperatures: $N_{10}=20-30$; $N_{20}=10-18$; $N_{30}=1-8$.*

*$N$ reflecting the amount of fat solids determined by NMR-analysis.

The low-fat spreads according to the invention are usually prepared by first dissolving the gelling mixture in water. If necessary, the water can be heated to 60°–100° C. The colloidal solution is then mixed with an aqueous solution containing proteins and further minor ingredients. The combined aqueous solutions are then emulsified with the fat blend and the emulsion obtained is subsequently cooled and worked in a way known per se, for instance in surface-scraped heat exchangers and resting tubes to obtain the final water-in-oil emulsion in the form of a spread.

The invention will now be illustrated in the following Examples:

EXAMPLE 1

A fat phase of the following composition was produced (the percentages are based on the total emulsion):

|  | % by weight |
| --- | --- |
| Fat blend | 40 |
| Monoglyceride | 0.2 |
| B-carotene | 0.02 |
| Vitamins | 0.001 |

The fat blend consisted of 35% sunflower oil, 40% bean oil, 20% hydrogenated palm oil (mixture of hydrogenated palm oil with a melting point ranging from 42°–58° C.) and 5% palmkenel oil.

An aqueous phase having the following composition was prepared (the percentages are based on the total emulsion):

|  | % by weight |
| --- | --- |
| Whey protein powder | 0.7 |
| Salt | 0.4 |
| Potassium sorbate | 0.1 |
| Lactic acid | 0.09 |
| Citric acid | 0.02 |
| Guar gum | 0.34 |
| Pectin (degree of esterification about 52%) | 0.06 |
| Water | up to 100 |

The pH was about 4.7.

The aqueous phase was emulsified with the fat blend and the emulsion obtained was fed through a Votator A unit, crystallizer. The w/O emulsion (low-fat spread) obtained was then packed at 15° C.

An almost identical fat spread was produced for comparison, starting from the same ingredients and substituting for the gelling system (guar/pectin) gelatin (in a proportion of 1.5%) which is considered to meet the requirements of the most critical palates.

Both spreads were presented to a panel of experts. On consumption no difference between the spreads could be perceived by the experts. The melting behaviour and the emulsion stability on storage were found to be satisfactory.

EXAMPLE 2

A low-fat spread was produced according to Example I, using a gelling system consisting of a mixture of guar gum and dextrin in a proportion of 0.4% guar gum and 0.03% dextrin (DE=48-50).

This low-fat spread was presented together with the spread containing gelating produced according to Example I to a panel of experts. On consumption no difference could be perceived by the experts. The melting behaviour and the emulsion stability of both spreads on storage were found to be equally satisfactory.

Comparative Example IA

A fat spread having almost the same composition as outlined in Example I was produced while using 0.3% by weight of guar gum and 0.1% by weight of pectin (degree of esterification about 52%).

The melting behaviour was satisfactory whereas the emulsion stability was poor.

Comparative Example IIA

A fat spread having almost the same composition as in Example II was produced while substituting dextrin (DE=50) in a proportion of 5% weight for the gelling system consisting of guar gum and dextrin (DE=50).

The melting behaviour under palate conditions was satisfactory, but the emulsion stability was poor.

We claim:

1. Water-in-oil edible emulsion spread having a fat content ranging from 25 to 65 wt%, which comprises a dispersed aqueous phase containing a gelling system comprising:
   (i) at least one hydrocolloid selected from the group consisting of dextrins having a DE-value of at least 20, pectin having a degree of esterification of at least 48%, lambda carrageenan and alginates; and
   (ii) at least one hydrocolloid selected from the group consisting of guar gum, locust bean gum and iota carrageenan wherein an effective amount of each type of said hydrocolloid is employed sufficient to stabilize the emulsion spread under storage conditions while de-stabilizing the emulsion spread under palate conditions affording a pleasant melting behavior.

2. Water-in-oil edible emulsion spread according to claim 1, in which the gelling system comprises guar gum and dextrins having a DE-value ranging from 40 to 65.

3. Water-in-oil edible emulsion spread according to claim 1, wherein the hydrocolloids are guar gum whose concentration ranges from 0.1 to 1.0 wt% and dextrins whose concentration ranges from 0.01 to 0.3 wt% based on the total composition.

4. Water-in-oil edible emulsion spread according to claim 1, in which the gelling system comprises guar gum and pectin having a degree of esterification of at least 48%, in a ratio exceeding 4:1.

5. Water-in-oil edible emulsion spread according to claim 1, in which the amount of pectin having a degree of esterification of at least 48% ranges from 0.01 to 0.3 wt% based on the total composition.

6. Water-in-oil edible emulsion spread according to claim 1, in which the aqueous phase comprises a protein at a level ranging from 0.01 to 8 wt%.

* * * * *